(12) United States Patent
Girard

(10) Patent No.: US 6,515,832 B1
(45) Date of Patent: Feb. 4, 2003

(54) GIMBAL STIFFNESS CONTROL FOR HEAD SUSPENSION ASSEMBLIES

(75) Inventor: Mark T. Girard, South Haven, MN (US)

(73) Assignee: Applied Kinetics, Inc., Hutchinson, MN (US)

(*) Notice: Subject to any disclaimer, the term of this patent is extended or adjusted under 35 U.S.C. 154(b) by 0 days.

(21) Appl. No.: 09/664,622

(22) Filed: Sep. 19, 2000

Related U.S. Application Data

(60) Provisional application No. 60/198,172, filed on Apr. 19, 2000.

(51) Int. Cl.[7] .................................................. G11B 5/48
(52) U.S. Cl. ................................ 360/245.3; 360/245.8
(58) Field of Search ...................... 360/245.3, 244.1, 360/245.8, 245.9, 97.02

(56) References Cited

U.S. PATENT DOCUMENTS

| | | | | | |
|---|---|---|---|---|---|
| 5,491,597 A | * | 2/1996 | Bennin et al. | ............ | 360/245.9 |
| 5,568,332 A | * | 10/1996 | Khan | ....................... | 360/245.3 |
| 5,675,454 A | * | 10/1997 | Hatanai et al. | .......... | 360/234.6 |
| 5,847,902 A | * | 12/1998 | Clifford, Jr. et al. | ..... | 360/245.6 |
| 5,875,070 A | * | 2/1999 | Khan et al. | .............. | 360/245.3 |
| 5,995,328 A | * | 11/1999 | Balakrishnan | ........... | 360/245.9 |
| 6,067,209 A | * | 5/2000 | Aoyagi et al. | ........... | 360/254.7 |
| 6,202,288 B1 | * | 3/2001 | Shiraishi et al. | ......... | 29/603.03 |

* cited by examiner

*Primary Examiner*—Jefferson Evans
(74) *Attorney, Agent, or Firm*—Kagan Binder, PLLC

(57) ABSTRACT

The present invention includes a polymeric/copper ring gimbal adhesively attached to a load beam. Such a gimbal further includes at least one deformation inhibiter for inhibiting and/or preventing the deformation of the gimbal, such deformation inhibiters comprising a forwardly or distally extending non-water absorbent appendage. Such a deformation inhibiting appendage may be an extension of the conductive traces forming the electrical pathway on the gimbal.

43 Claims, 16 Drawing Sheets

GIMBAL STIFFNESS CONTROL FOR HEAD SUSPENSION ASSEMBLIES

This application claims the benefit of Provisional application No. 60/198,172, filed Apr. 19, 2000.

The invention described and claimed herein relates generally to hard disk drives used to store information in computers and particularly to an improved suspension assembly used in such hard disk drives.

BACKGROUND OF THE INVENTION

Most personal computers today utilize direct access storage devices (DASD) or rigid disk drives for data storage and retrieval. Presently, a disk drive includes at least one disk that has a selectively magnetizable magnetic coating. In addition, a disk drive will include a read/write "head" that is positioned a microscopic distance from the disk surface. During operation, the read/write head is said to "fly" over the disk as the disk is rotated at speeds currently ranging from 3600 revolutions per minute (rpm) to 15,000 rpm. Information is stored on or written to the disk by the selective magnetization of the disk's magnetic coating and is retrieved or read from the disk by sensing the previous selective magnetizations. The read/write head is affixed to the disk drive by a suspension assembly and electrically connected to the disk drive electronics by an electrical interconnect. This structure (suspension, electrical interconnect, and read/write head) is commonly referred to in the industry as a Head Gimbal Assembly, or HGA. The read/write head, along with a slider, is disposed at the distal end of an electrical interconnect/suspension assembly.

More specifically, currently manufactured and sold read/write heads include an inductive write head and a magneto resistive (MR) read head or element or a "giant" magneto resistive (GMR) element to read data that is stored on the magnetic media of the disk. The write head writes data to the disk by converting an electric signal into a magnetic field and then applying the magnetic field to the disk to magnetize it. The MR read head reads the data on the disk as it flies adjacent to it. To do this, a "sense" current is sent through the read head. As the read head passes over the varying magnetized areas on the disk surface, a current will be induced in the read head according to well-known electromagnetic principles. This will result in a change in the sense current, which is accompanied by a change in the current voltage. The changes in the sense current or the sense current voltage in turn is converted into a binary data stream.

An exploded view of a typical electrical interconnect/suspension assembly is shown in FIG. 1, which illustrates several components including a suspension A and an interconnect B. It will be understood that the actual physical structures of these components may vary in configuration depending upon the particular disk drive manufacturer and that the assembly shown in FIG. 1 is meant to be illustrative of the prior art only. Typically, the suspension A will include a base plate C, a radius (spring region) D, a load beam E, and a flexure F. At least one tooling discontinuity G may be included. An interconnect B may include a base H, which may be a synthetic material such as a polyimide, that supports typically a plurality of electrical traces or leads I of the interconnect. The electrical interconnect B may also include a polymeric cover layer that encapsulates selected areas of the electrical traces or leads I.

Stated otherwise, suspension A is essentially a stainless steel support structure that is secured to an armature in the disk drive. The read/write head is attached to the tip of the suspension A with adhesive or some other means. The electrical interconnect B is terminated, that is, electrically connected, to bond pads on the read/write head and provides an electrically conductive path between the disk drive electronics at one end thereof and the read and write elements in the read/write head at the other end thereof. The electrical interconnect is usually comprised of individual electrical conductors supported by an insulating layer of polyimide and typically covered by a cover layer.

Successful operation of a hard disk drive is dependent upon many factors. Among them are the fly height and the geometric and physical characteristics of the HGA.

As mentioned previously, the slider is spaced a small distance, or fly height, apart from the spinning disk. The fly height must be controlled within a narrow range for the disk drive to operate successfully. As the fly height increases, the ability of the read/write head to read or write data to the disk diminishes; as the fly decreases, the slider can more easily hit the disk surface, commonly known as a "crash" or as "crashing the drive" and resulting in the permanent loss of stored data.

The fly height of the slider is partly determined by the characteristics of the head suspension assembly to which it is mounted. One of these characteristics is the vertical load, commonly referred to as the "gram load", imparted on the slider by the head suspension assembly. This vertical or gram load is directed normal to the surface of the disk in order to oppose the "lift" forces created by the air passing between the slider and the spinning disk. In other words, as the slider flies relative to the disk, the air flowing between the slider and the disk results in the creation of a lifting force that tends to push the slider away from the disk. The gram load is provided to counter those lift forces. This balancing of opposing forces is a delicate task since the fly height must be maintained within the desired range. As a result, head suspension assemblies are manufactured with a very precise gram load, typically with a tolerance of +0.2 grams.

Another factor determining slider fly height is the relative position of the head suspension assembly load center relative to the slider air bearing geometry. If this load center or "load point" is mis-aligned relative to the air bearing surface of the slider, an undesired torque is placed on the slider, which can cause an undesired slider pitch and/or roll. If the slider pitches or rolls, the spacing of the read/write element from the disk surface will be affected because the pitching or rolling motion of the slider changes its orientation and thus the orientation of the read/write elements relative to the disk surface.

Yet another head suspension assembly characteristic that can have a significant effect upon the fly height of a slider is referred to as "static attitude." Static attitude is the angular attitude of the gimbal to which the slider is mounted relative to disk surface. Typically, head suspension assemblies are manufactured with tolerances for static attitude approaching +30 arc-minutes and the gimbal stiffnesses are designed to be very low (or highly compliant) to allow the slider air bearing forces to correct for static attitude tolerances during operation. If the static attitude is outside the desired range, a torque can be imparted to the slider, which as previously noted, can create an undesired slider pitch and/or roll.

Successful reading or writing of data between the head and the spinning disk also requires that the head be precisely positioned relative to the location on the disk from which data is to be read or to which data is to be written. Presently, data is written to hard drives along circular "tracks" on the disk. If a mode of vibration in the load beam or gimbal creates or causes motion that in turn prompts the read/write element to move off the track to be read or written to, the hard drive's ability to follow the data tracks, and thus read and write to the disk properly, will be compromised. Specifically, to resist off-track motion, the side to side or lateral gimbal stiffness is desirably kept high in the gimbal area. As such, great care is taken to design and manufacture head suspension assemblies so as to optimize the suspension's vibrational, or resonant, performance. Traditionally, there exists a trade-off between the desire for high lateral stiffness and the desire for low pitch and roll stiffnesses.

During gimbal manufacture and use, gimbal vertical stiffnesses are desired to be high, thereby enabling the head suspension assembly to resist handling damage during the various manufacturing processes, to maintain slider position during shock event, and to maintain normal geometry under the designed pre-load. In the sense just used, "vertical" means perpendicular to the plane of the disk during operation. That is, it is desired that the gimbal resist motion toward and away from the disk surface to maintain the desired fly height for the reasons previously given. Many suspension products have a low vertical gimbal stiffness. Manufacturers of such products attempt to counter the negative effects of low vertical gimbal stiffness by restraining the vertical deflection of the HGA with the load point and also with motion limiting features. These "limiters" are configured to be disposed a predetermined distance away from the gimbal during normal operation, but to engage and limit gimbal motion when the gimbal is subjected to handling damage, shock or other potential causes of poor performance or damage. Unfortunately, gimbal limiting devices are difficult to align and assemble precisely and they occupy critical space needed for other features, such as slider bond pads, manufacturing alignment holes, circuit trace routing, and load/unload features.

Currently, there are three basic configurations of electrical interconnect/suspension assemblies that are utilized in the disk drive industry—the Trace Suspension Assembly or TSA; the CIS; and the Flex Suspension Assembly or FSA. Each of the foregoing configurations is known as wireless suspension because individual, separately manufactured wires have been replaced by the leads of the TSA, CIS, or FSA.

In a TSA, the electrical interconnect is fabricated integrally with the flexure. The TSA flexure/interconnect is fabricated by selectively removing material from a laminate of stainless steel, polyimide, and copper. The TSA flexure/interconnect is then attached to a loadbeam, typically with one or more spot welds between the stainless steel layer of the TSA flexure/interconnect and the stainless steel of the loadbeam.

Another interconnect configuration, termed CIS, is very similar to TSA in that the CIS interconnect is also fabricated integrally with the flexure. The CIS interconnect/flexure, however, is fabricated with "additive" processes, rather than "subtractive" processes like the TSA. The CIS interconnect/flexure is attached to a load beam in much the same manner as the TSA flexures and conventional flexures are, with one or more spot welds between the stainless steel of the flexure and that of the loadbeam.

The third and final interconnect/suspension configuration widely utilized today by disk drive assemblers, the FSA, includes what is essentially a flexible interconnect circuit. The flexible interconnect circuit consists of a base polymer, typically a polyimide, which supports copper traces, or leads. In this case, the interconnect circuit is fabricated independently from the flexure, and is later adhesively attached to a conventional head suspension assembly to form an FSA.

While the motivation for using a wireless suspension is to improve performance and reduce cost, current products have fallen short of one or both of these goals. A list of current technical and cost issues with the current products follows:

1) pitch and roll stiffnesses are not low enough for future requirements, which generally will require reduced fly heights;
2) gimbal vertical stiffnesses are too low and shock limiting features are required;
3) they are susceptible to handling damage;
4) under shock conditions the slider parallelism to the disk is not well maintained;
5) their pitch and roll static attitude changes significantly when subjected to temperature and humidity extremes;
6) they are difficult to manipulate during electrical termination, due to the spatial constraints caused by complex limiters, trace routings, and other constraints; and
7) they are expensive to manufacture due to the numerous extra steps during forming, welding, and manipulating.

As such, it is the object of the present invention to eliminate the performance and cost disadvantages of the current electrical interconnect/suspension assemblies.

SUMMARY OF THE INVENTION

It is an object of the present invention to provide a polymeric/copper gimbal suspension with significantly low gimbal pitch and roll stiffnesses while maintaining high lateral stiffnesses.

It is still another object of the present invention to provide a polymeric/copper gimbal suspension with significantly low gimbal stiffnesses and high vertical stiffness and the ability to limit slider motion during handling and shock events.

It is yet another object of the present invention to provide a polymeric/copper gimbal suspension which minimizes static attitude change due to temperature and humidity changes.

It is another object of the present invention to provide a polymeric/copper gimbal suspension which allows for a maximum amount of space for head electrical termination and manipulation.

It is another object of the present invention to eliminate the welding of a stainless steel gimbal to a load beam during suspension manufacturing.

It is yet another object of the present invention to eliminate stainless steel gimbal etching, forming, and manipulation during suspension manufacturing.

It is still a further object of the present invention to provide a method for assembling the read/write head slider to the circuit, making an electrical termination, and then attaching the flexible circuit/head/slider assembly to the suspension, while simplifying each and every manufacturing step and improving static attitude and load point control.

The present invention is directed to an integral electrical interconnect/suspension assembly that positions a read/write magnetic transducer head adjacent the rotating surface of a disk in a disk drive from an actuator arm of the disk drive, and the method of constructing the head suspension assembly. The head suspension is disclosed in various embodiments, all including specific polymeric/copper ring gimbals to both improve the performance characteristics and lower the cost to manufacture and use these products.

More specifically, the present invention as described and illustrated herein includes a polymeric/copper ring gimbal adhesively attached to a load beam. A gimbal according to the present invention further includes at least one deformation inhibiter for inhibiting and/or preventing the deformation of the gimbal due to humidity. In one embodiment of the present invention, the inhibiter may include a forwardly or distally extending appendage. Such a deformation inhibiting appendage may be an extension of the conductive traces forming the electrical pathway on the gimbal. Preferably, such inhibiters are resistant to the absorption of water, unlike the polymeric substrate of the gimbal.

The foregoing objects of the invention will become apparent to those skilled in the art when the following detailed description of the invention is read in conjunction with the accompanying drawings.

DESCRIPTION OF THE INVENTION

Figure 1:
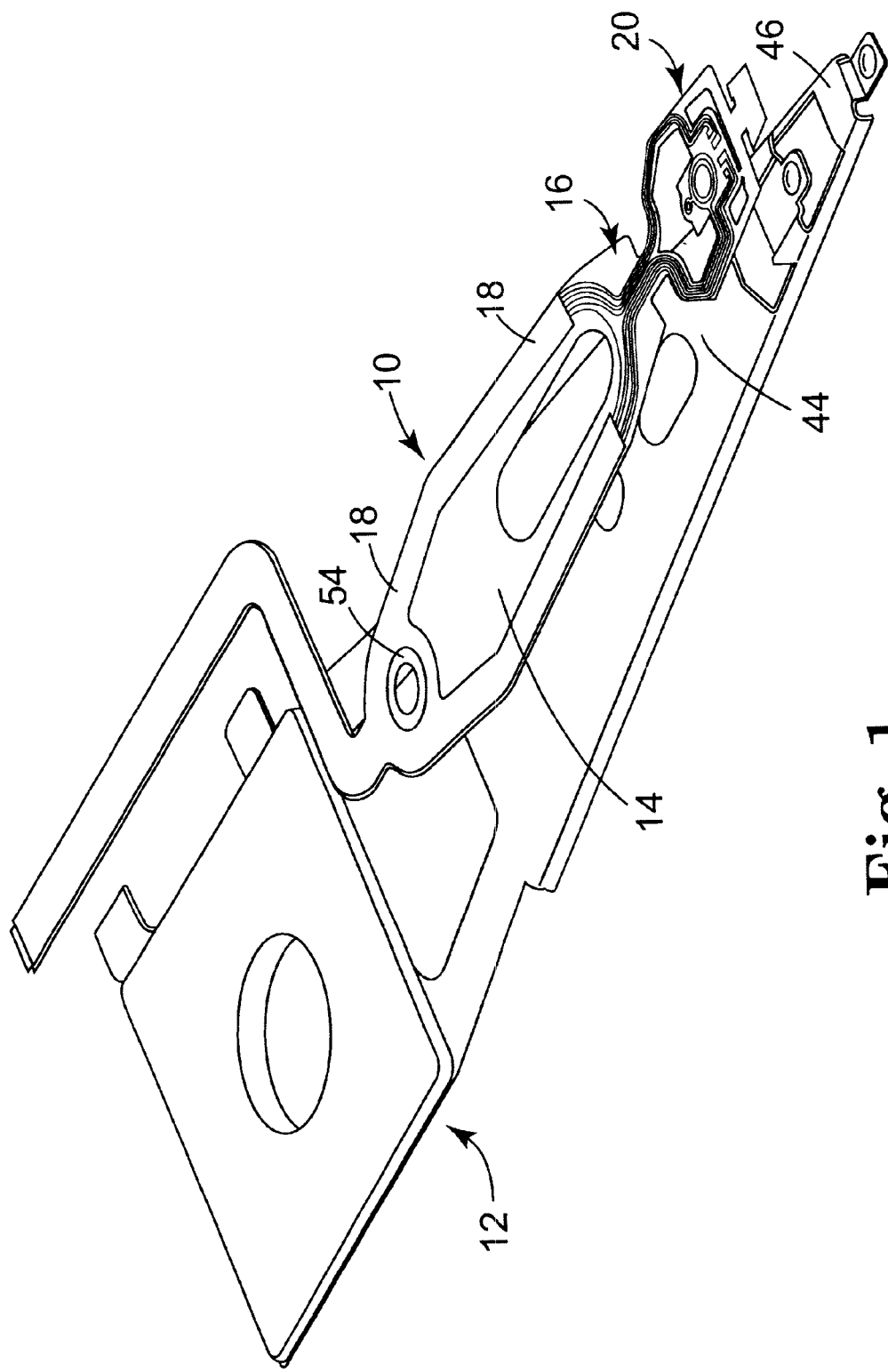
FIG. 1 is a perspective view of an embodiment of a head gimbal assembly in accord with the present invention.

FIG. 1 shows an interconnect 10 and an associated load beam 12 in an exploded perspective view relative to a load beam. As seen in the Figure, an interconnect 10 includes a polyimide substrate 14 that support a plurality of electrical traces 16. Interconnect 12 may include a cover layer 18 that extends over a predetermined extent of the traces 16. Interconnect 10 includes at its distal end a ring gimbal 20 in accord with the present invention.

Figure 2:
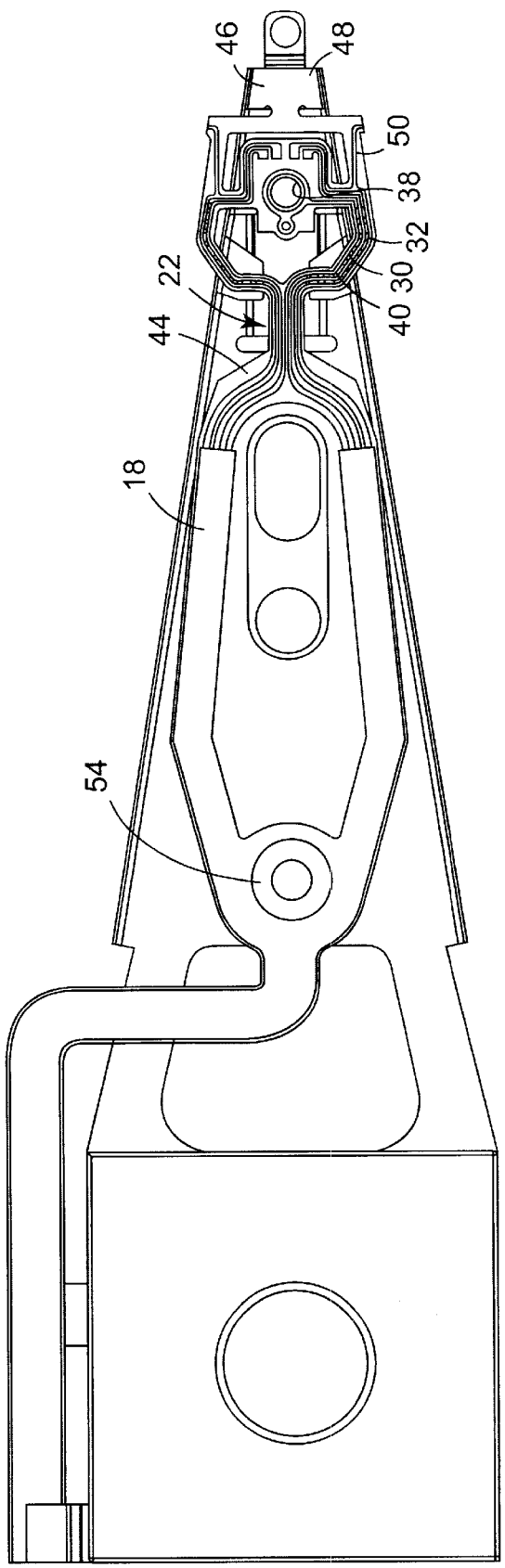
FIG. 2 is a top plan view of a ring gimbal in accord with the present invention.
Figure 3:
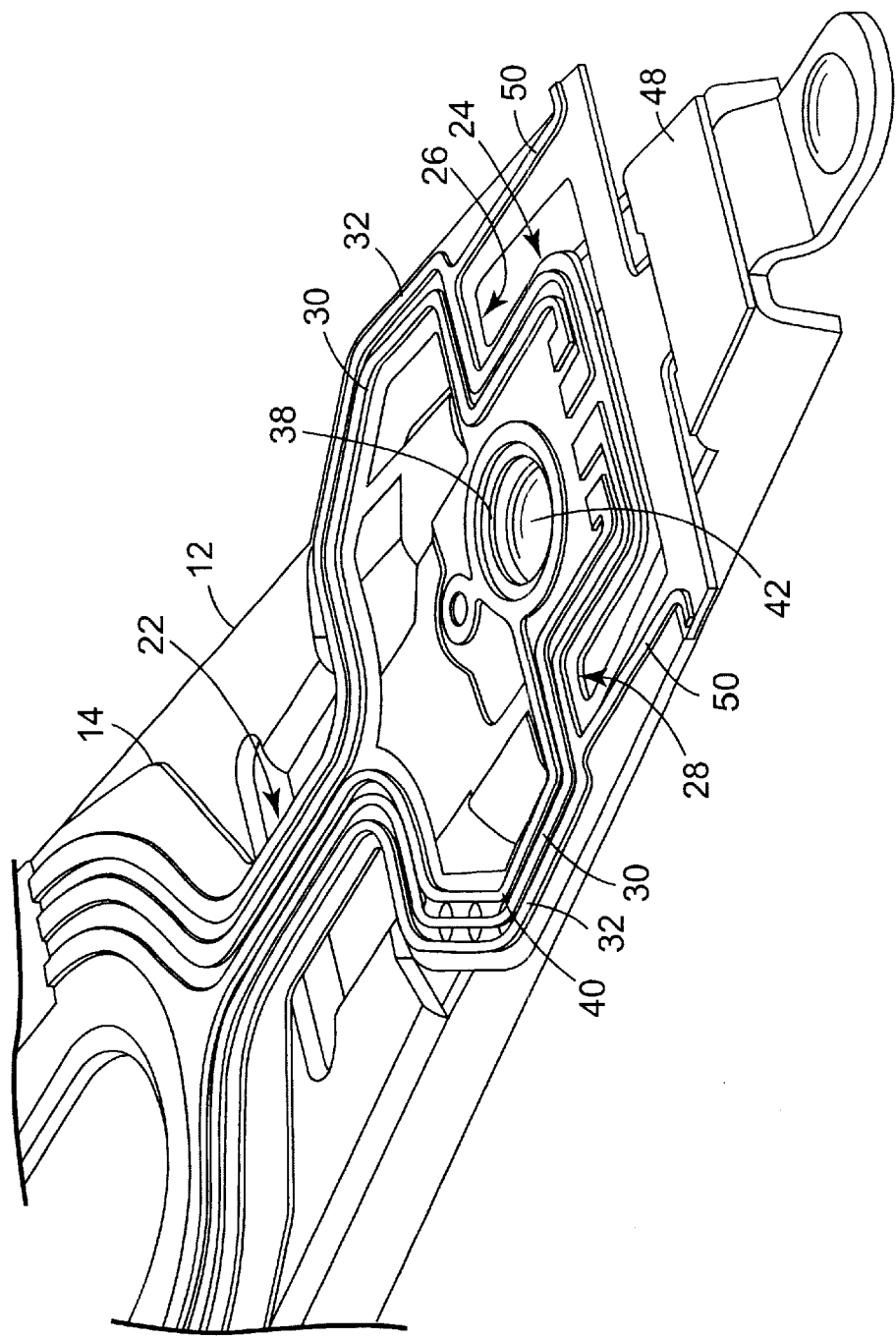
FIG. 3 is a perspective view of a ring gimbal in accord with the present invention.
Figure 4:
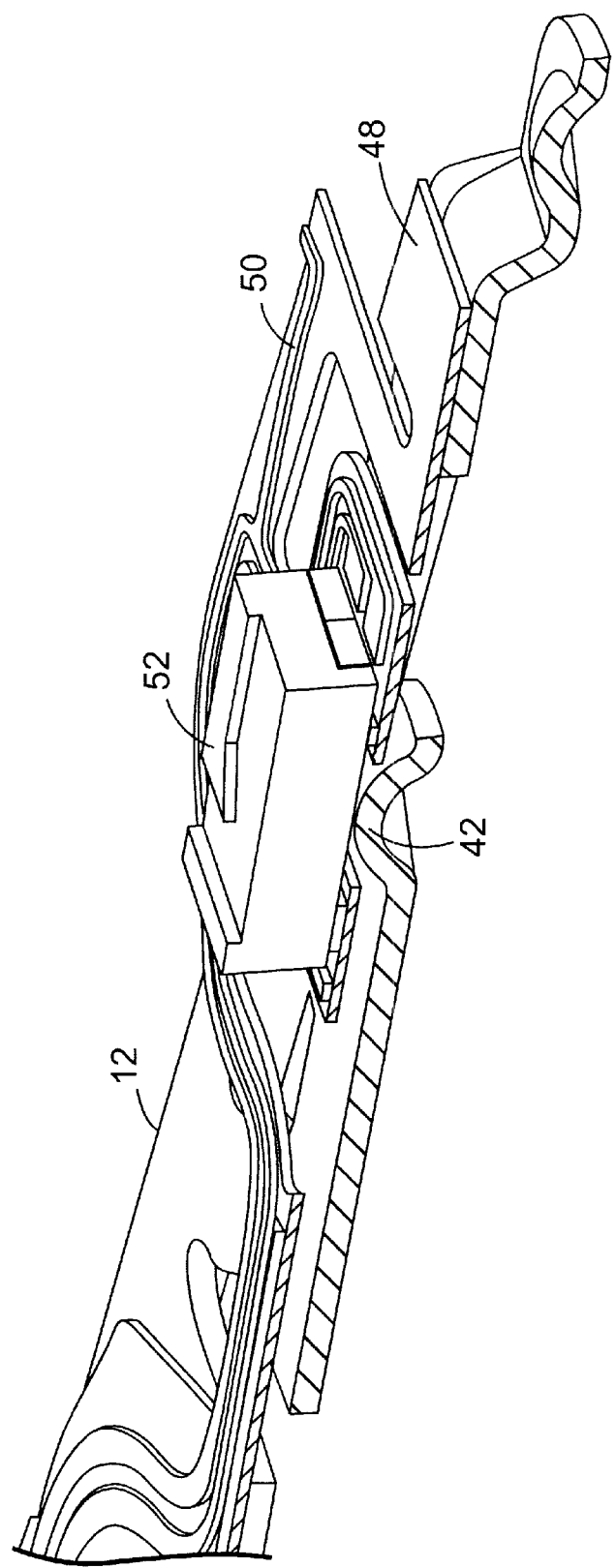
FIG. 4 is a perspective cross sectional view of a ring gimbal in accord with the present invention.

A ring gimbal 20 in accord with the present invention is shown in greater detail in FIGS. 2–4. Ring gimbal 20 has been geometrically optimized to provide low pitch and roll stiffnesses, high lateral stiffness, high vertical stiffness, and to have a very low change in static attitude when subjected to temperature and humidity extremes. The gimbal 20 includes a "neck" 22 providing a pathway for the traces back to the drive electronics. Gimbal 20 also includes a slider bond area and a pair of torsion arms 26 and 28. The slider bond pad 24 includes the read and write traces or leads 30, 32, respectively, to which a slider with the read/write elements will be electrically terminated. In the tongue or slider bond area 24, the invention is shown with only polyimide and copper, but alternatively there can be another layer of backside metal, such as copper or stainless steel, and/or, the leads 30 and 32 could include a cover layer except where for the termination pads 34. The torsion bars 26, 28 shown are generally on the pitch axis 36 of the gimbal 20 and are near the slider (not shown) center to reduce the gimbal's static pitch sensitivity to humidity. On the proximal end (nearest the suspension base plate), the traces 30, 32 are routed close to the centerline, i.e., on the neck 22, and close together to keep roll stiffness low. Inside of the pitch torsion arms 26, 28, the traces 30, 32 are routed around the slider and looped up and back to the electrical termination pads.

The ring gimbal 20 may further include a through hole 38 disposed on the slider bond area 24 that is surrounded by a ground trace or lead 40, which may be configured as desired about the through hole 38 so as to provide an adequate ground for the slider. The through hole 38 is provided and configured to receive a dimpled load point 42 on the load beam 12.

The gimbal 20 will be attached to the load beam 20 with adhesive. Adhesive will be dispensed onto the load beam at two locations, generally indicated at proximal location 44 and distal location 46 (FIG. 2). Thus, with respect to the ring gimbal 20, it will be noticed that the gimbal 20 includes an adhesive attachment tab 48 extending distally that is adhesively bonded to the load beam 12. The attachment tab 48 admirably provides a member for attaching the distal end of the interconnect 10 and hence the ring gimbal 20 to the load beam 12. Without the tab 48, the slider bond area 24 would have to be adhesively attached to the load beam 12. Doing so, however, would tend to undesirably stiffen the ring gimbal 20 in the area of the slider.

Polyimide will naturally absorb moisture from the air and will, consequently, swell. This swelling will cause the slider to be pitched forward. To reduce and/or prevent such pitch action due to the absorption of humidity in the air, ring gimbal 20 includes a pair of deformation inhibiters 50 in the form of trace extensions that extend distally onto the tab 48 from the write traces 32. Inhibiters 50, like the traces 30, 32, and 40, are made of copper, which does not absorb water. The inhibiters 50 will function to reduce and/or prevent any pitching due to the absorption of water from the air by the polyimide of the interconnect 10.

This ring gimbal 20 can be used for femto size sliders and achieve about 035 $\mu$Nm/deg pitch and roll stiffnesses, 6.5 N/m lateral stiffness, and about 6~8×10$^{-4}$ deg/(% Relative Humidity) humidity sensitivities. When optimized for pico size sliders, the pitch and roll stiffnesses are about 0.4 to 0.85 $\mu$Nm/deg, the lateral stiffness is about 7 N/m, and the humidity sensitivities are between 2~5×10$^{-4}$ deg/(% Relative Humidity).

Also seen in FIGS. 1–2 are grounding schemes for an embodiment of the present invention. Sliders are traditionally grounded to the suspension steel, but since the flex gimbal circuit eliminates a continuous steel path (see FIG. 4), other grounding schemes are needed. In this embodiment of the present invention, a ground trace 40 is etched along with the signal traces. A slider 52 is electrically grounded to the ground trace 40 via contact and/or conductive adhesive, and then the ground is made to the suspension load beam 12 through conductive adhesive through a ground donut 54 in the load beam region. Alternatively, the ground trace can be routed all the way back to the proximal end of the wireless suspension and can also be shunted to the read and write pairs for protecting the head from electrostatic discharge or electrical overstress. These grounding and shunting features allow the present invention to be used to attach the slider first to the circuit and then that entire head/flex assembly can be attached to the suspension loadbeam 12.

FIG. 2 shows the flex gimbal of the present invention attached to a load beam of the present invention to complete a wireless suspension assembly of the present invention. In FIG. 2, reference is made to the proximal and distal attachment zones 44 and 46, respectively, for fixing the flex gimbal circuit to the load beam. If constructed as a polyimide and copper structure, the attachment would include adhesive. It may be desirable, however, in some embodiments of the flex gimbal to construct the interconnect 10 as a steel/polyimide/copper laminate with the steel removed in the gimbal area to reduce the stiffness. With such a construction, the attachment of the interconnect 10 to the loadbeam 12 could be made via laser welds in the attach zones 44 and 46. The relative height between the proximal and distal attach zones 44 and 46 will serve to set the static pitch angle nominal value and therefore either one or both of those heights can be controlled to set the nominal pitch static attitude. Variation in heights of those surfaces will strongly influence the variation of final assembly static attitude. Similarly, the static roll angle of the attach surfaces will greatly influence the final roll nominal and variability. The roll angle of the one or both of the attachment surfaces can be adjusted and targeted to get the desired final static attitude. In a similar manner, the entire tip of the load beam can be bent to control the interim and final pitch nominal and variability.

Referring to FIG. 4, the dimpled load point 42 makes contact with the slider 52. Alternately, the dimpled load point can be formed in the load beam 12 or etched as a tower in the load beam 12. Furthermore, the load beam 12 could make contact on polyimide from the flex gimbal circuit or make contact on backside metal left in the bond pad region 48 but not the low stiffness ring or torsion arm regions of the interconnect 10. While FIGS. 2–4 show a load point in the stiffened portion of the load beam, the present invention can be manufactured without such load point. In this case, the only contact between the flex gimbal circuit and the load beam would be at the said proximal and distal attachment zones and there would be an absence of a load point contacting or passing through the flex gimbal circuit 10.

The ring gimbal shown in FIGS. 1–4 is desirably configured for use with femto sliders. Because of their small size, the gimbal pitch and roll stiffnesses need to be very low. To provide the desired low gimbal pitch and roll stiffnesses, another torsion arm 58 is used between the distal attachment zone 46 or the attachment tab 48 and the flex gimbal 20. This extra torsion arm provides additional flexibility, that is reduces stiffness, of the distal end of the interconnect.

Figure 5:
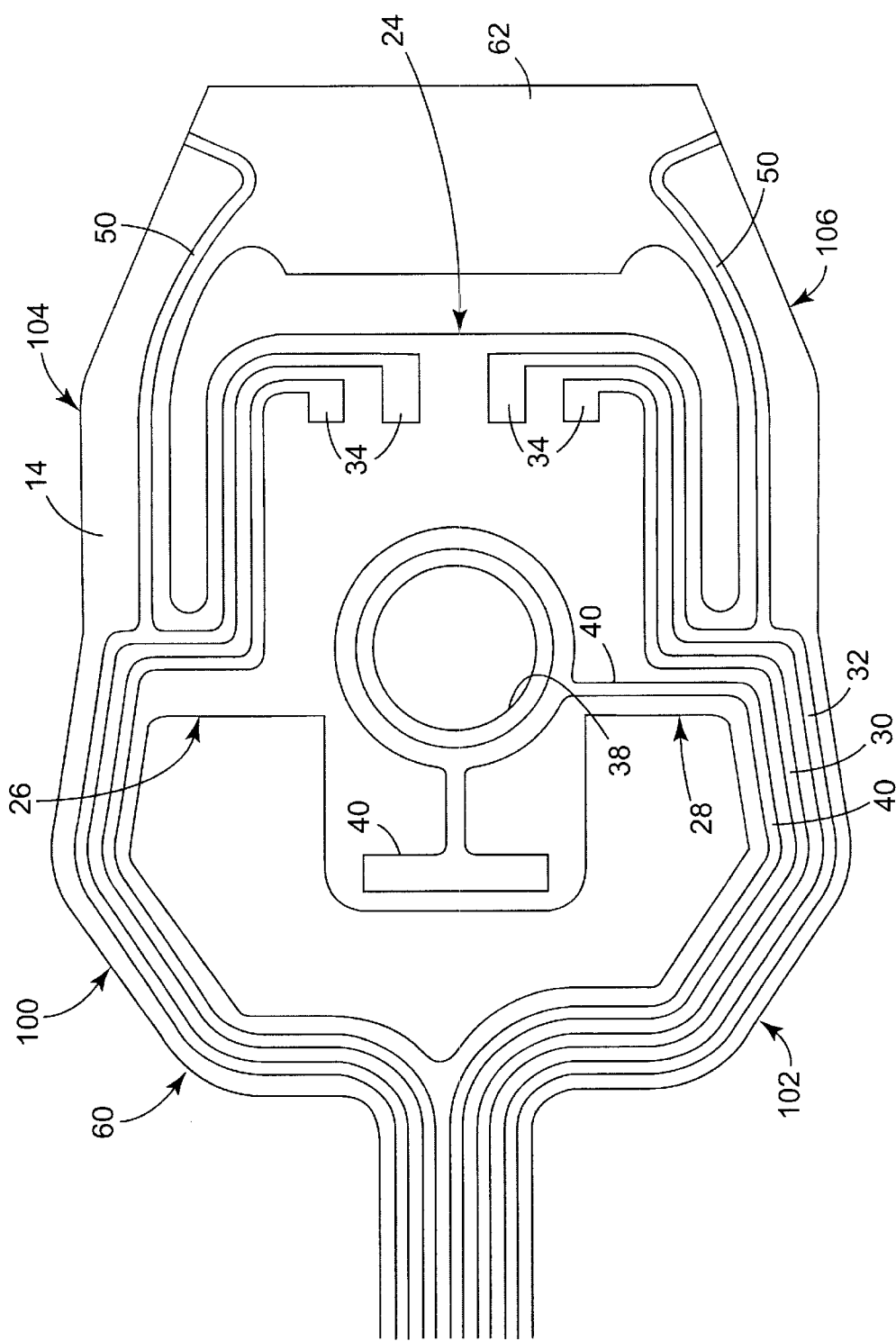
FIG. 5 is a top plan view of another embodiment of a ring gimbal in accord with the present invention.
Figure 6:
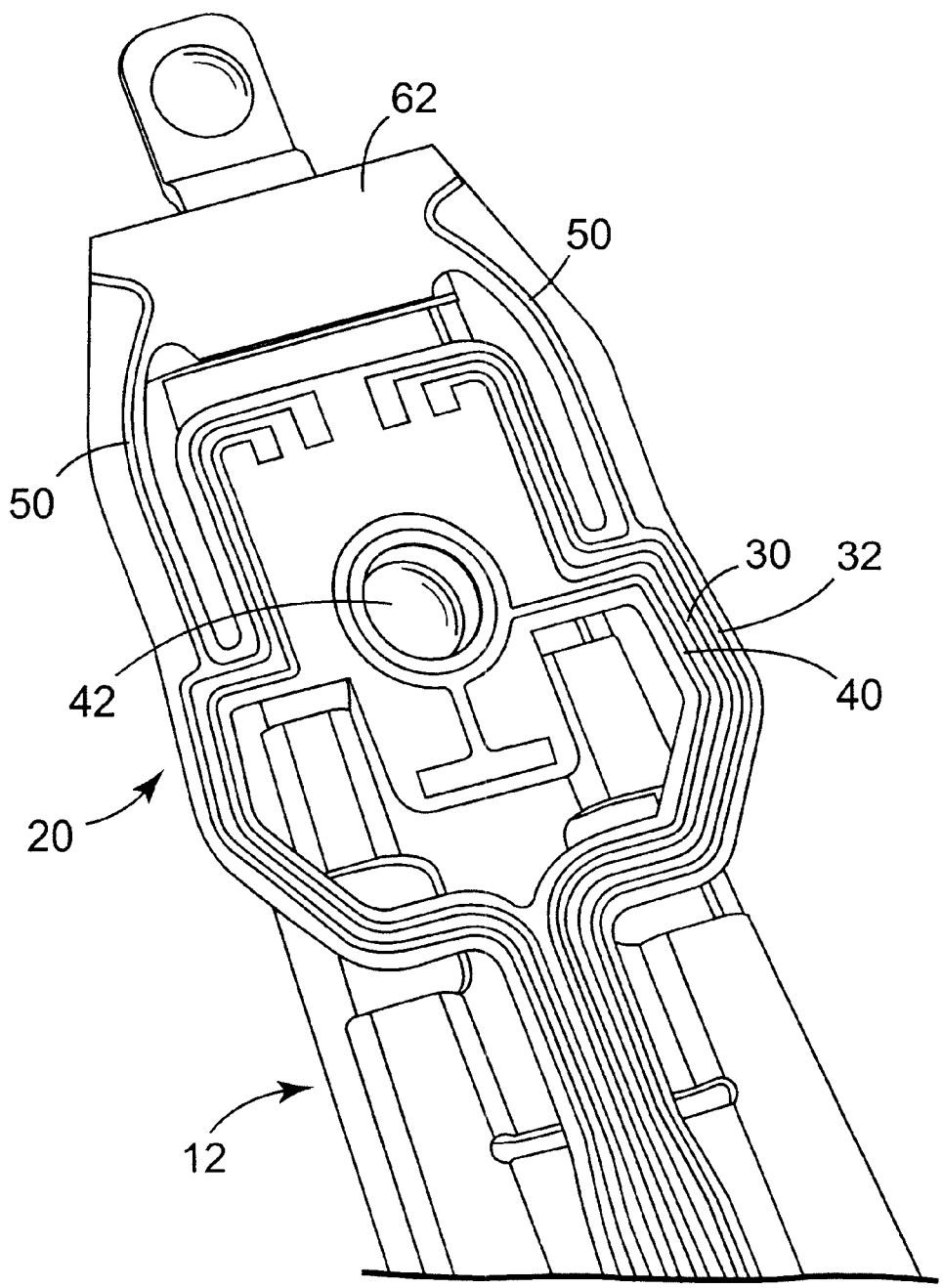
FIG. 6 is a perspective view of the embodiment of a ring gimbal shown in FIG. 5.

Referring now to FIGS. 5 and 6, another embodiment of a ring gimbal 60 in accord with the present invention is illustrated. Gimbal 60 is substantially similar to gimbal 20, with the principle distinction at the distal end thereof. It will be observed that gimbal 60 includes a distal attachment tab 62 and that the inhibiter traces 50 extend thereon and substantially to the most distal end of the interconnect.

Figure 7:
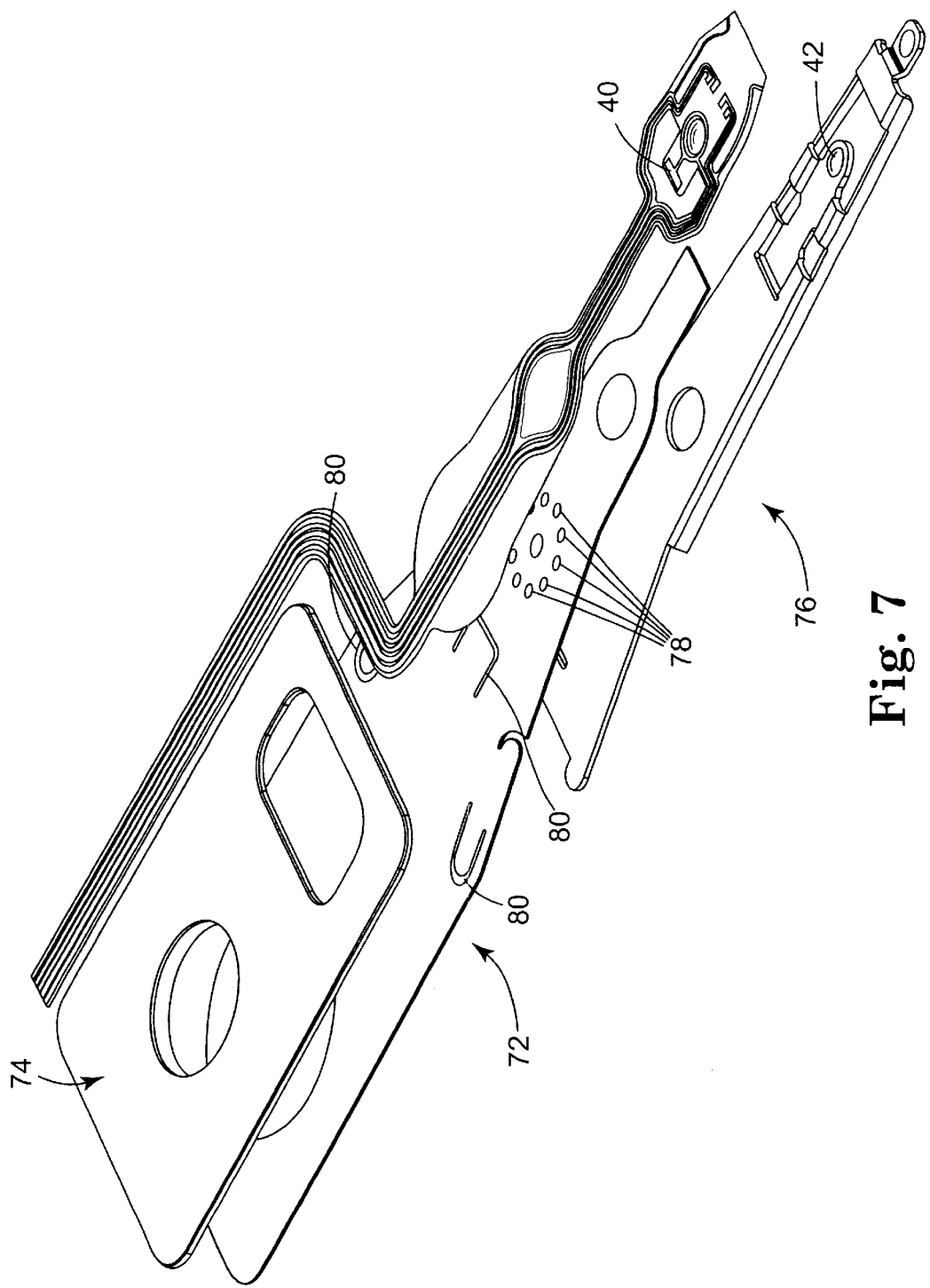
FIG. 7 is an exploded perspective view of an embodiment of an HGA in accord with the present invention and illustrates a multi-member load beam.

FIG. 7 shows a wireless suspension 70 of the present invention. Suspension 70 is comprised of a load beam spring member 72, a load beam stiffened member 74, and a gimbal attach member 76. Along with the flex gimbal circuit, the spring region steel 72 and the stiffened/attach region steel 76 are brought together via an adhesive attachment. The adhesive creates a stiffer structure which in turn enables the achievement of greater than 3 khz bending mode frequency and greater than 7 khz torsion mode frequencies. Member 72 includes adhesive ports 78 to enable an adhesive to flow between the circuit and spring material and between the spring material and stiffened/attach material. Further, FIG. 7 shows adhesive control features comprising slots or openings 80 to contain the adhesive to predetermined locations and assure predictable performance for gram load, static attitude and resonance.

Figure 8:
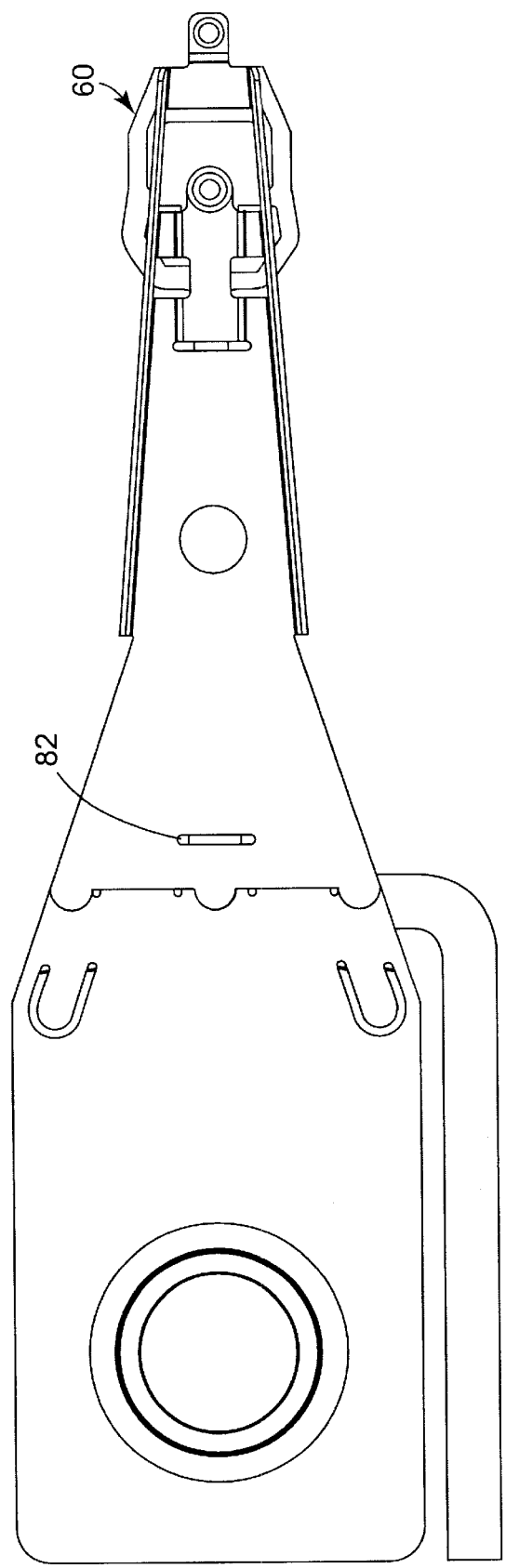
FIG. 8 is a reverse assembled view of the load beam shown in FIG. 7.

FIG. 8 shows a backside or non-disk side view of the assembly from FIG. 7. Illustrated there is a 82 adhesive control feature 8 which is used to assure that adhesive does not flow in and around the base plate reference area. Additional details on the adhesive control features can be found in Provisional Patent Application Serial No. 60/184,913 filed Feb. 25, 2000 and entitled "Adhesive Control Features for Wireless Head Suspension Assemblies", the entirety of which is incorporated herein by reference.

Stated otherwise, and in general reference to FIG. 5, a ring gimbal, such as gimbals 20 and 60, in accord with the present invention may include a substantially ring-shaped gimbal comprised of a polyimide substrate supporting at least one electrical lead or trace. The "ring" portion of the gimbal may comprise a pair of arms 100, 102 that extend outwardly and distally from the neck 22 and a pair of arms 104, 106 that extend inwardly and distally from the arms 100, 102, respectively. Where arm pair 100 and 104 and pair 102 and 106 join, A slider bond pad area 24 is disposed within the ring created by the arms 102–106 and are joined thereto by a pair of torsion arms 26, 28. The neck 22, the arms 100 and 102, the torsion arms 26 and 28, and the slider bond pad area 24 support the electrical traces 30, 32, and 40 used to electrically connect the slider 52 to the drive electronics. As shown, the arm 102 also supports a ground trace, which could also be supported as well by arm 100. The most distal arms 104 and 106 provide support for the deformation inhibiters 50, which can comprise dummy or live copper traces 50.

The sensitivity of a ring gimbal to humidity can be reduced further if desired. For example, since the polyimide substrate absorbs humidity, reducing the amount of polyimide present will lessen the tendency for the interconnect to swell and pitch about the pitch axis. Alternatively, additional copper traces can be added to reduce the tendency to pitch when moisture is absorbed.

Figure 9:
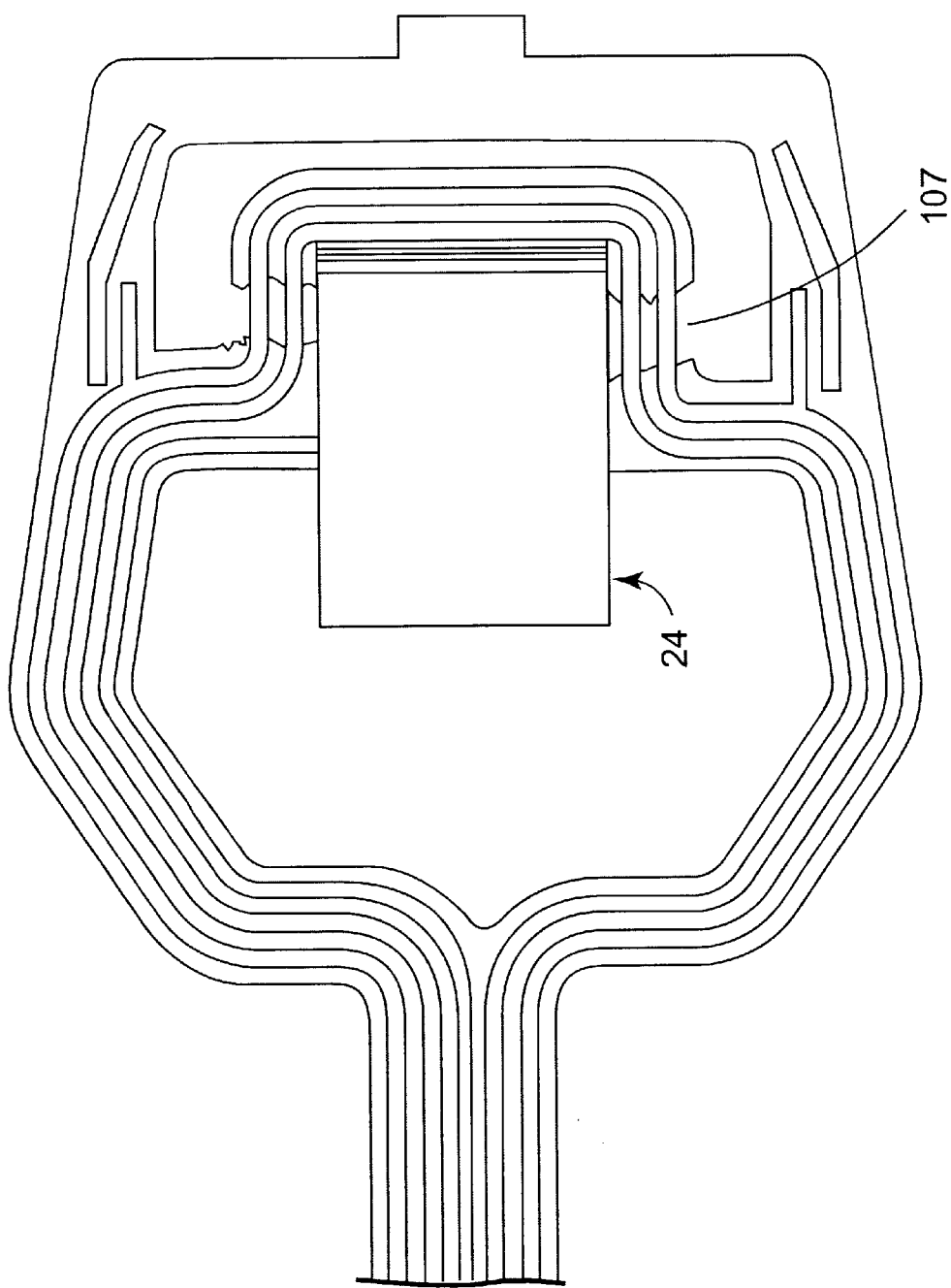
FIG. 9 shows a gimbal that has selected portions of the underlying water absorbing substrate removed to reduce the influence of ambient humidity in the air on the orientation of the slider by reducing the tendency to pitch due to swelling caused by moisture absorption.

Thus, FIG. 9 illustrates a ring gimbal in accord with the present invention where portions of the supporting polyimide substrate have been removed to reduce the gimbal static attitude humidity sensitivity. As seen in the Figure, the polyimide underlying the traces leading to the termination pads 34 on the slider bond area 24 has been removed leaving open spaces 107. Thus, because there is much less polyimide to absorb water in this area, this area will be much less subject to swelling and to pitch about the pitch axis.

Figure 10A:
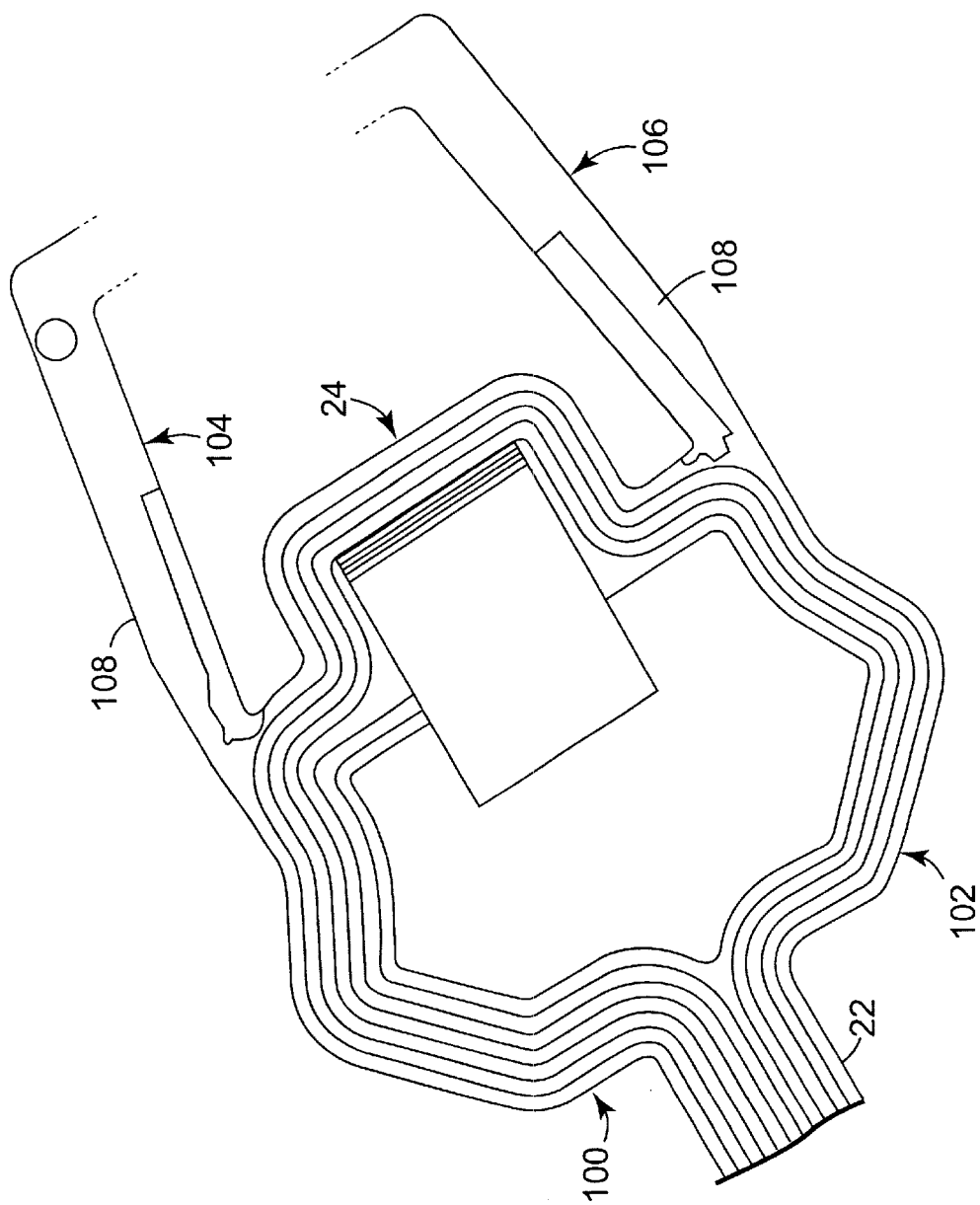
FIGS. 10A–10E show alternative embodiments including dummy traces that have been added to a gimbal in accord with the present invention.

FIGS. 10A–10E show embodiments of the present invention that include the addition of dummy traces to the ring gimbal to enhance its resistance to deformation due to moisture absorption. In FIG. 10A, dummy traces 108 have been added to the legs 104, 106. As seen, these traces are wider than those forming the read/write traces. The width can be controlled as desired to balance the deformation inhibiting action of the traces with that of the other operating characteristics of the gimbal, such as pitch and roll stiffness.

Figure 10B:
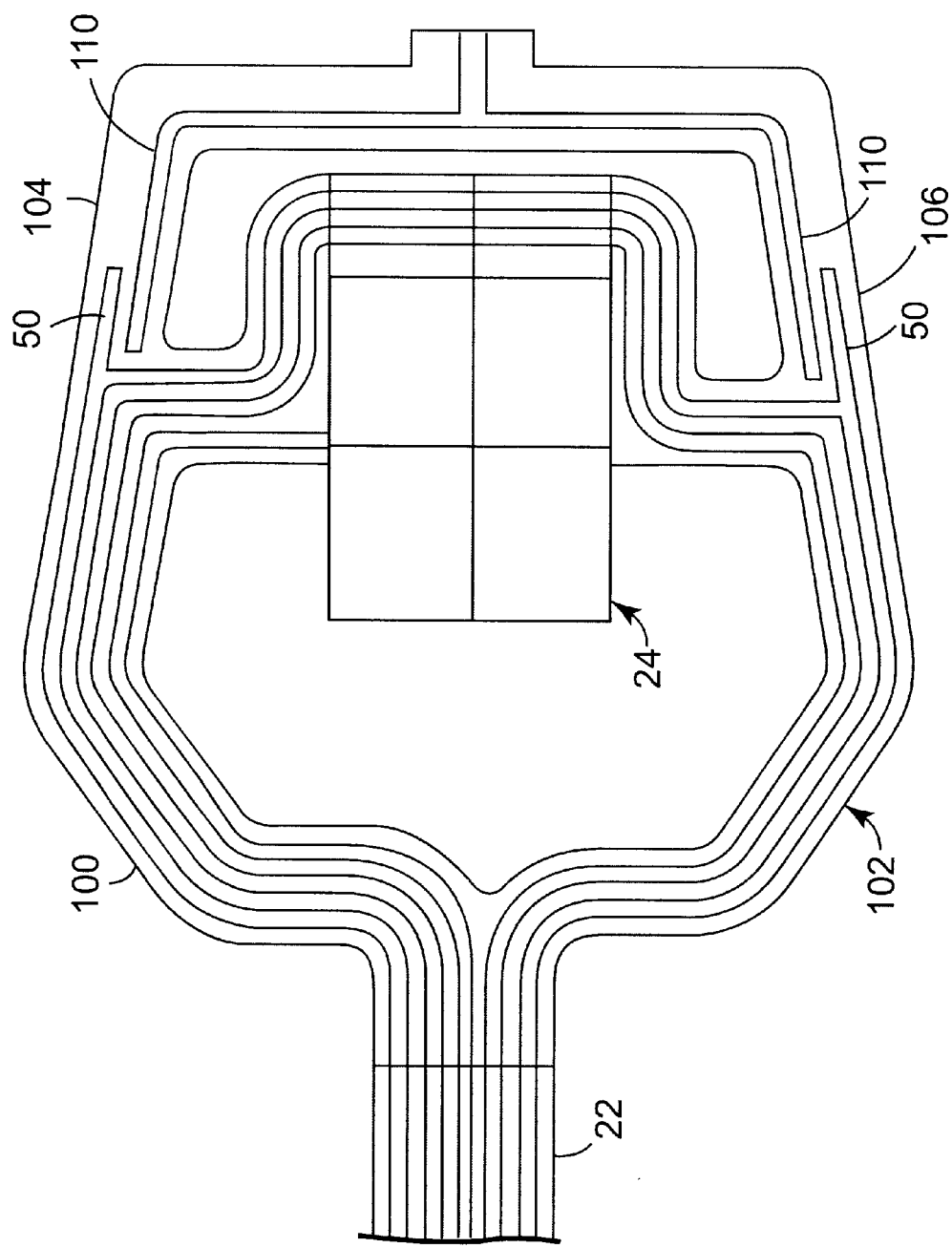

FIG. 10B illustrates a ring gimbal where the arms 104 and 106 include a pair of live traces 50 and a unitary dummy trace 110 that extends from the proximal end of the arms 104, 106 distally to extend across the most distal end.

Figure 10C:
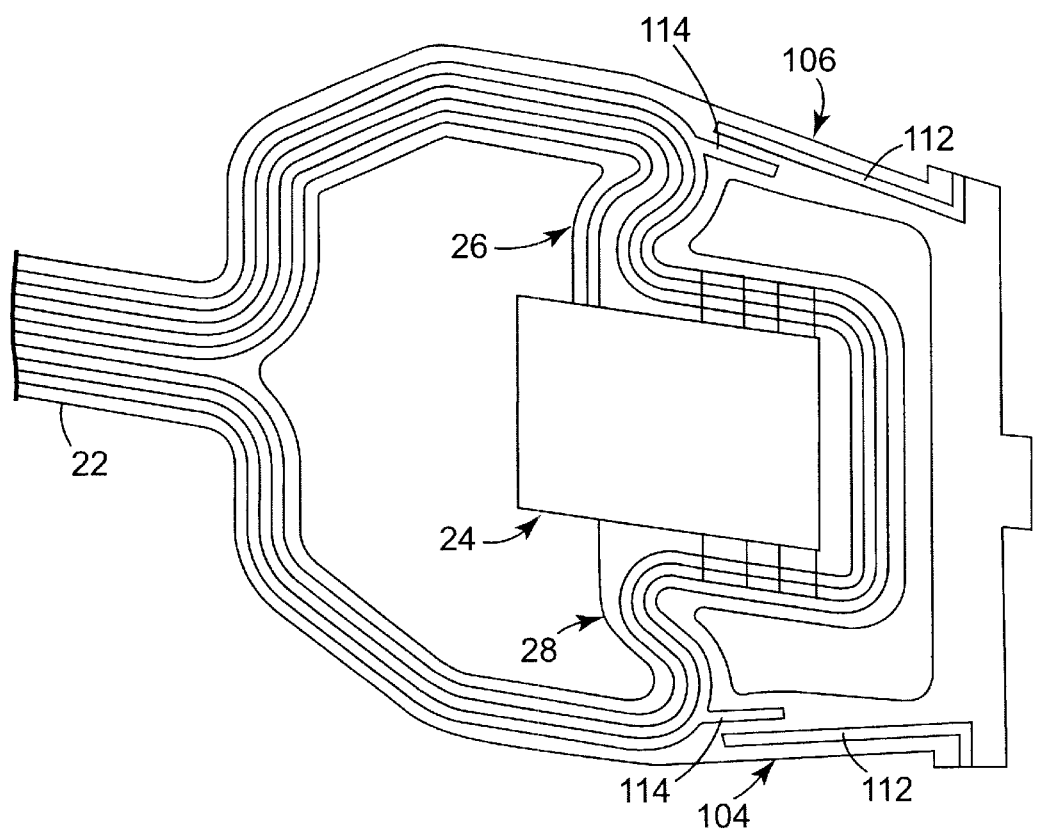

FIG. 10C shows a ring gimbal including a pair of dummy traces 112 disposed on arms 104 and 106. Traces 112 have substantially the same configuration as the live traces of gimbals 20 and 60; however, they are electrically isolated from the read/write traces. It will be observed that a pair of short live traces 114 extend distally onto the arms 104 and 106 inwardly of the dummy traces 112. The live traces 114 and the dummy traces 112 overlap a short distance on the arms 104, 106, thereby providing increased resistance to pitching in this area.

Figure 10D:
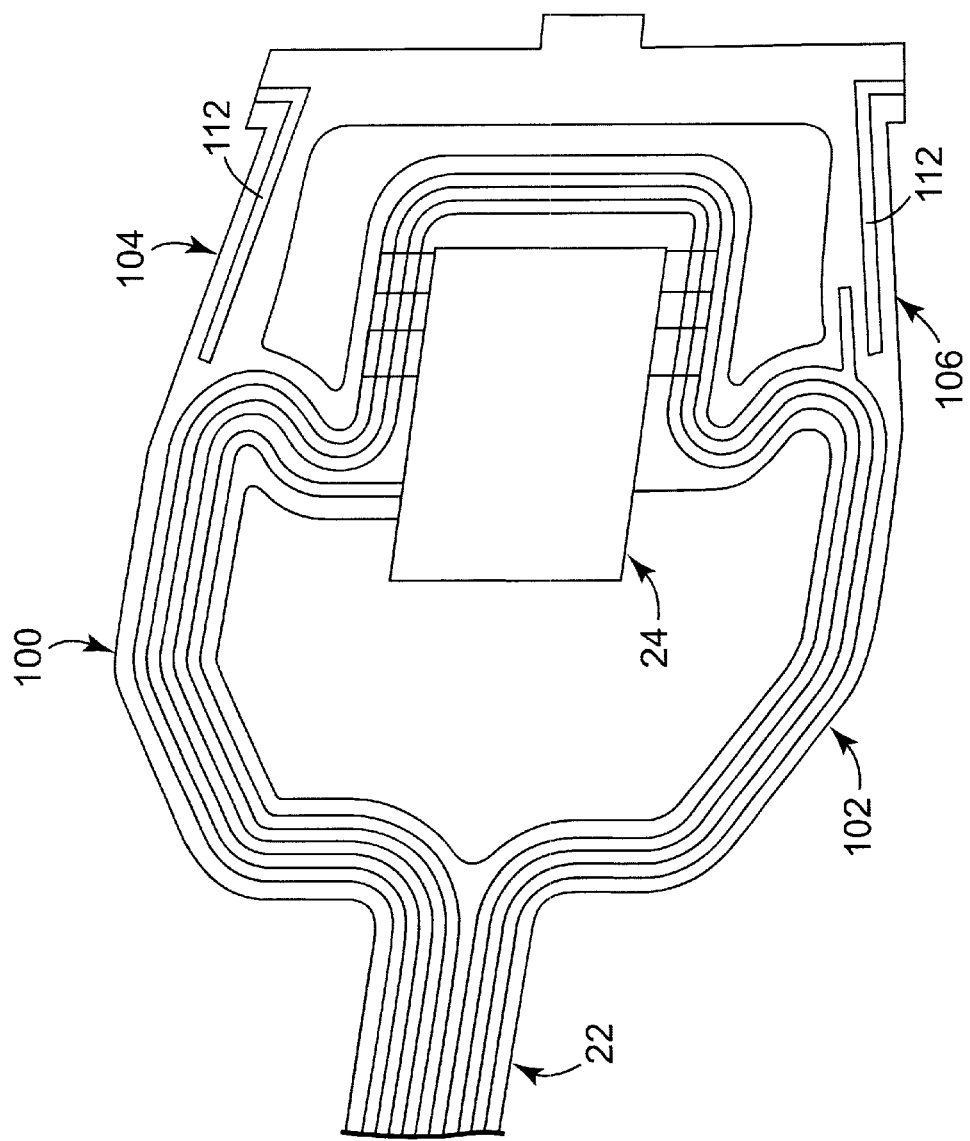

FIG. 10D shows a gimbal similar to that of FIG. 10C except that it lacks the short live traces 114.

Figure 10E:
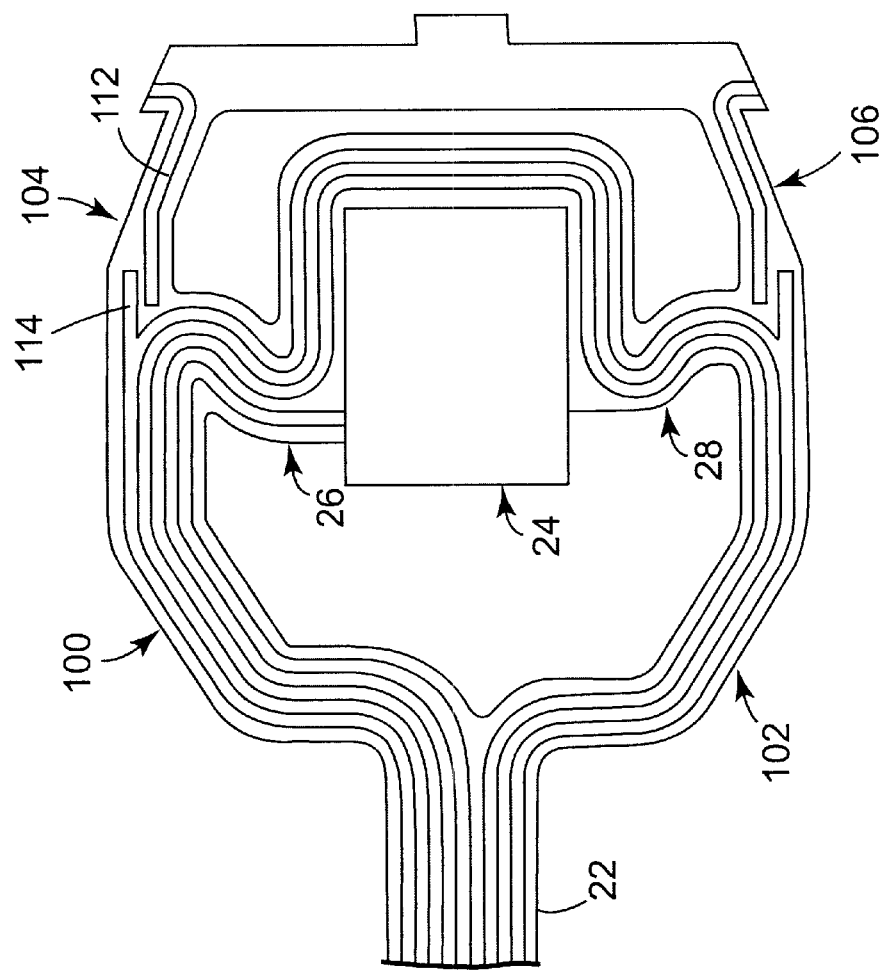

FIG. 10E shows a gimbal similar to that of FIG. 10C except that here the dummy traces 112 lie inwardly of the short, live traces 114.

It will be noted with reference to FIGS. 10A–10E that the dummy traces are shown on the same side of the gimbal as the read/write traces. It will be understood that, since there is no need for an electrical termination that the dummy traces could also be placed on the other side of the gimbal. It will also be noticed with reference to FIGS. 10C–10E that the torsion arms 26, 28 need not be linear but can adopt any configuration required to meet the performance parameters of the ring gimbal. Thus, as seen in those Figures, the torsion arms 26 and 28 have a curved or wavy configuration rather than a linear configuration and that the traces disposed thereon also have adopted a curved layout.

Figure 11A:
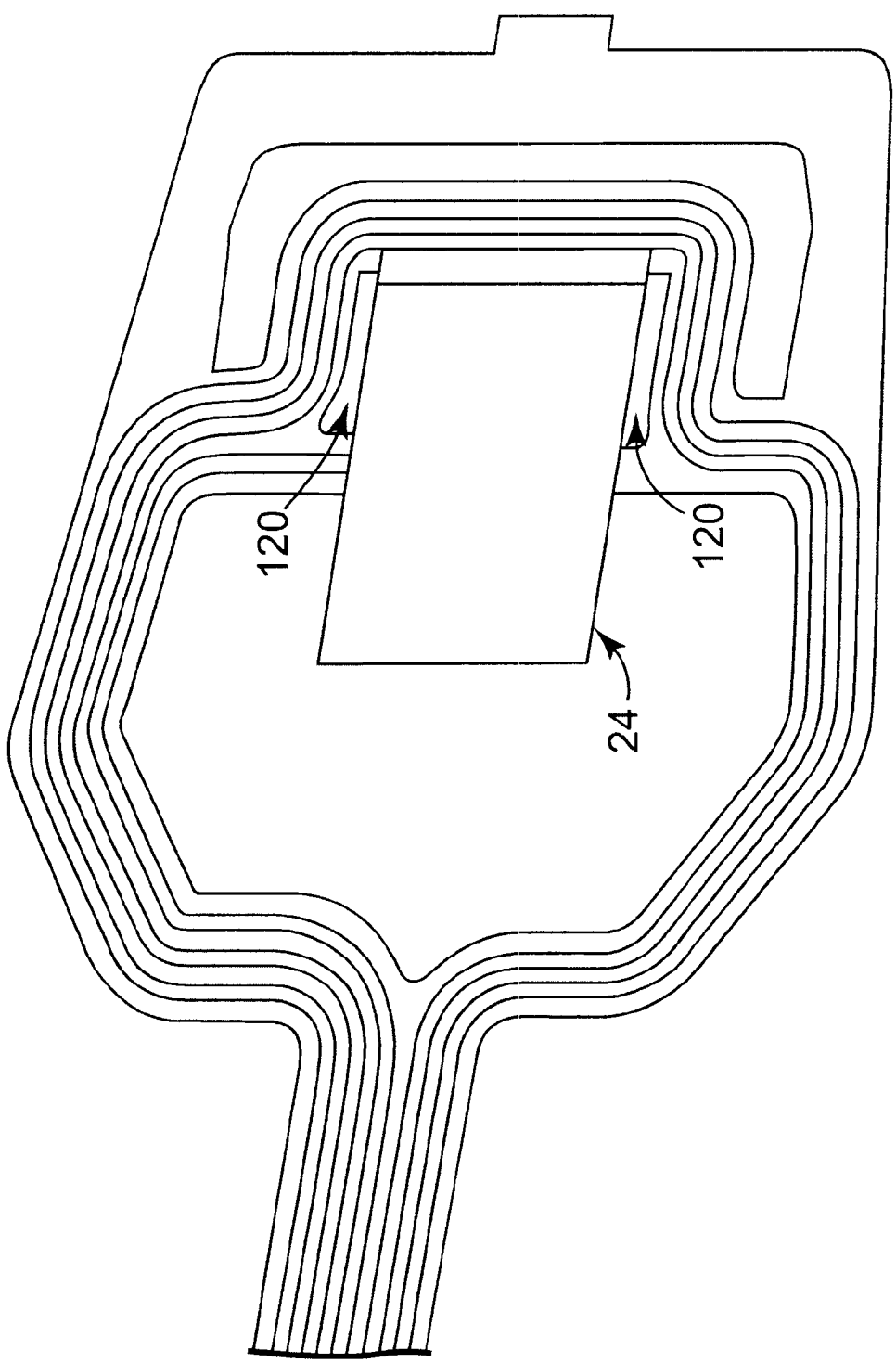
FIGS. 11A and 11B show alternative embodiments of the present invention including a ring gimbal having portions of the polyimide removed.
Figure 11B:
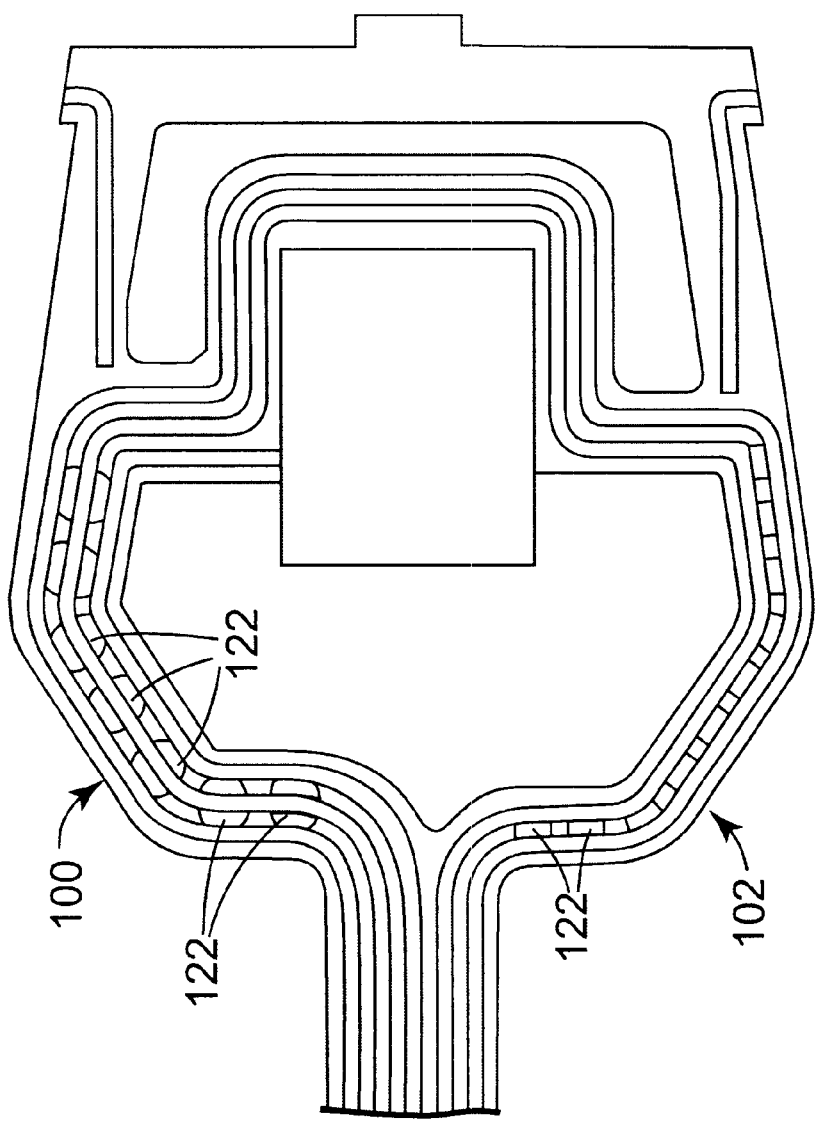

Pitch stiffness can also be reduced by providing through holes in the polyimide. Thus, the provision of through holes serves at least two functions. First, it can reduce the sensitivity of the gimbal to relative humidity and, second, it can reduce the pitch stiffness of the gimbal. FIGS. 11A and 11B show embodiments of the present invention which includes specific through holes in the polyimide to reduce pitch stiffness of the gimbal. Thus, referring to FIG. 11A it will be observed that polyimide has been removed from the bond pad area 24 as indicated at 120. The removed areas 120 are located inwardly of the read/write traces as they loop around to the termination pads 34. FIG. 11B shows the removal of polyimide in the areas 122 lying generally between the traces on the arms 100 and 102.

In a method for assembling an HGA a ring gimbal will be fixtured and a conductive epoxy will be dispensed onto the ring gimbal in the attachment zones 44 and 46. The slider 52 will then be aligned relative to the ring gimbal and then applied to the gimbal. Optionally, the slider can be tacked into position using an ultraviolet light to partially cure the adhesive. The adhesive can then be cured in any known manner.

After the slider adhesive has been cured, it is necessary to electrically terminate the head and suspension. Thus, the slider will be clamped in the appropriate fixturing device and heat will be applied to the gimbal, either through the substrate 14, the copper traces, or both. The read/write elements of the slider 52 can then be terminated to the termination pads 34 either through ultrasonic bonding or solder reflow.

The foregoing steps are simplified with the present invention because the components are all flat and the load point of the HGA is ignored at this point in time. An advantageous feature of the present method is that the ground trace 40 is located under the slider 52. To prevent damage to the ring gimbal and slider read/write elements, the read and write pairs are preferably shunted to ground, such as the ground trace. Other advantages are that there is less susceptibility to static angle damage and it enables the interconnect and slider to undergo static electrical testing prior to its attachment to the suspension.

To complete the assembly of the HGA, the interconnect will be attached to the loadbeam. First, an adhesive will be dispensed on the fixtured loadbeam. Then, the interconnect will be positioned relative thereto and the slider air bearing surface aligned with the suspension and applied to the suspension. A conductive epoxy can be dispensed in the grounding donut 54 if desired. The adhesives can then be cured.

The foregoing process can be performed in the shipping trays for the loadbeam/suspensions and enables the use of an optical alignment of the air bearing surface to the loadbeam.

The present invention thus provides a ring gimbal that provides for reducing pitching by controlling deformation of the interconnect due to moisture absorption by providing deformation inhibiters in the form of copper traces that extend distally beyond the end of the slider. Dummy traces may be used, including dummy copper traces that longitudinally overlapping small appendage traces from the signal lines for moisture balancing, which is minimizing the static attitude effect from humidity changes. The water balancing appendage traces can be overlapped with the dummy traces outboard or inboard from the read/write appendage traces. While the dummy traces are shown to be on the same side as the signal lines, they can alternatively be on the back side or opposite side. Such back side balancing metal can also be stainless steel. In addition, a ring gimbal in accord with the present invention may include polyimide holes in the bond pad region which also reduce static attitude sensitivity to humidity.

Furthermore, the present invention provides a gimbal having desired low pitch and roll stiffness and high side-to-side and vertical stiffness, which cannot be provided with gimbals made out of steel. The ability to provide high vertical stiffness enables the elimination of the motion limiters found in the prior art. The present invention also facilitates making the static angle correct because the gimbal is bonded to a solid structure.

The present invention having thus been described, other modifications, alterations, or substitutions may now suggest themselves to those skilled in the art, all of which are within the spirit and scope of the present invention. For example, while the use of copper traces as moisture balancers has been proposed, any other material that is non-absorbent of water could also be used. It is therefore intended that the present invention be limited only by the scope of the attached claims below.

What is claimed is:

1. A ring gimbal comprising:
   a polymeric substrate; and
   at least one electrical lead,
wherein said gimbal includes a first pair of torsion arms supporting a slider bond pad and at least one additional arm extending at least partially past said slider bond pad, wherein said additional arm includes disposed thereon at least one non-water absorbent trace which acts as a deformation inhibitor.

2. The ring gimbal of claim 1 wherein said non-water absorbent trace comprises copper.

3. The ring gimbal of claim 1 wherein said non-water absorbent trace is formed on the polymeric substrate by etching.

4. The ring gimbal of claim 1 wherein said non-water absorbent trace is formed on the polymeric substrate by an additive process.

5. The ring gimbal of claim 4 wherein the said additive process is chosen from the group of sputtering, plating, or vapor deposition.

6. The ring gimbal of claim 1 wherein said gimbal forms the distal end of an interconnect wherein said first pair of torsion arms extend distally and outwardly and further including a second pair of arms connected to said first pair, said second pair of arms converging distally of said slider bond pad, wherein each arm of said second pair of arms includes disposed thereon at least one non-water absorbent trace.

7. The ring gimbal of claim 1 wherein said non-water absorbent trace is connected to said electrical lead.

8. The ring gimbal of claim 1 and further including an electrical appendage lead extending from said at least one electrical lead distally onto one of said second pair of arms.

9. The ring gimbal of claim 8 wherein said electrical appendage lead overlaps with said non-water absorbent trace.

10. The ring gimbal of claim 1 wherein said slider bond pad includes a through hole for receiving a dimpled load point of a hard disk drive suspension.

11. The ring gimbal of claim 10 and further including a ground trace surrounding said through hole.

12. The ring gimbal of claim 1 wherein said slider bond pad includes a ground trace for grounding said slider bond pad.

13. An interconnect for a hard disk drive having proximal and distal ends and comprising a polymeric substrate, said substrate supporting a read lead and a write lead extending from said proximal to said distal end, wherein said interconnect includes a ring gimbal at said distal end of said interconnect, said ring gimbal having a substantial ring-like configuration and comprising a first pair of arms extending distally and outwardly and a second pair of arms connected to said first pair, said second pair arms converging distally of said slider bond pad, wherein each of said second pair of arms includes disposed thereon at least one non-water absorbent trace which acts as a deformation inhibitor.

14. The interconnect of claim 13 wherein said non-water absorbent trace is made of copper and is connected to at least one of said electrical leads.

15. The interconnect of claim 13 further including an electrical appendage lead extending from at least one of said electrical leads distally onto one of said second pair of arms.

16. The interconnect of claim 15 wherein said electrical appendage lead overlaps with said non-water absorbent trace.

17. The interconnect of claim 13 wherein said slider bond pad includes a through hole for receiving the dimpled load point of a hard disk drive suspension.

18. The interconnect of claim 17 further including a ground trace surrounding said through hole.

19. The interconnect of claim 13 and further including a ground donut disposed substantially midway between said proximal and distal ends.

20. The interconnect of claim 19 wherein said ground donut includes a through hole and a ground trace surrounding said through hole.

21. The interconnect of claim 13 and further including a ground trace, said ground trace being grounded to said load beam.

22. The interconnect of claim 21 wherein said ground trace is grounded to said load beam with a conductive adhesive.

23. The interconnect of claim 13 wherein said interconnect includes a layer of stainless steel underlying the slider pad.

24. The interconnect of claim 13 wherein said interconnect includes proximal and distal bonding areas for bonding to a loadbeam and wherein said interconnect includes a layer of stainless steel underlying the bonding area.

25. An interconnect for forming an electrical connection to a head for use in a dynamic storage device, the interconnect comprising:
   a polymeric substrate;
   a ring gimbal positioned at a distal end of the interconnect and including a slider bond pad and at least one arm which connects to the slider bond pad and which arm at least partially extends distally past the slider bond pad; and
   at least one non-water absorbent deformation inhibitor positioned on at least a portion of the at least one arm which extends distally past the slider bond pad.

26. The interconnect of claim 25, wherein the at least one non-water absorbent deformation inhibitor comprises copper.

27. The interconnect of claim 25, further comprising at least one electrical trace formed on the polymeric substrate.

28. The interconnect of claim 27, wherein at least a portion of the at least one electrical trace is a read trace which extends at least partially onto the slider bond pad.

29. The interconnect of claim 27, wherein at least a portion of the at least one electrical trace is a write trace which extends at least partially onto the slider bond pad.

30. The interconnect of claim 27, wherein at least a portion of the at least one electrical trace is a ground trace which extends at least partially onto the slider bond pad and which is capable of electrically grounding the slider bond pad.

31. The interconnect of claim 27, wherein the at least one non-water absorbent deformation inhibitor comprises an extension of at least a portion of the at least one electrical trace.

32. The interconnect of claim 25, in combination with a slider which slider is mounted to the slider bond pad of the ring gimbal.

33. The interconnect of claim 32, wherein the slider is mounted to the slider bond pad with a conductive adhesive.

34. The interconnect of claim 25, wherein the slider bond pad includes an opening capable of allowing a load point of a load beam to pass through the opening such that the load point can pivotably support a slider positioned on the slider bond pad.

35. The interconnect of claim 25, wherein the slider bond pad comprises a layer of stainless steel.

36. The interconnect of claim 25, in combination with a load beam which load beam includes a load capable of pivotably supporting the slider bond pad of the interconnect and for allowing the slider bond pad to pitch and roll about the load point.

37. The combination of claim 36, wherein the load beam comprises at least one bonding region located on the load beam for attaching the interconnect to the load beam.

38. The combination of claim 37, wherein the at least one bonding region is positioned at a distal end of the load beam and comprises a bonding tab.

39. The combination of claim 38, further comprising at least one additional bonding region positioned proximally on the load beam for attaching the interconnect to the load beam.

40. The combination of claim 39, wherein the interconnect is adhesively attached to the load beam at the bonding tab and at the at least one additional bonding region.

41. The combination of claim 39, wherein the slider bond pad includes an opening in the slider bond pad which opening allows the load point of the load beam to pivotably support the slider.

42. The combination of claim 36, further in combination with a slider which slider is mounted to the slider bond pad of the ring gimbal.

43. The combination of claim 42, wherein the slider is mounted to the slider bond pad with conductive adhesive.

* * * * *

UNITED STATES PATENT AND TRADEMARK OFFICE
CERTIFICATE OF CORRECTION

PATENT NO.   : 6,515,832 B1  Page 1 of 1
DATED        : February 4, 2003
INVENTOR(S)  : Girard It is certified that error appears in the above-identified patent and that said Letters Patent is hereby corrected as shown below:

<u>Column 11,</u>
Line 57, -- and -- should be inserted before "further".

<u>Column 12,</u>
Line 54, -- point -- should be inserted before "capable".

Signed and Sealed this

Sixth Day of May, 2003

JAMES E. ROGAN
*Director of the United States Patent and Trademark Office*